United States Patent Office 2,768,194
Patented Oct. 23, 1956

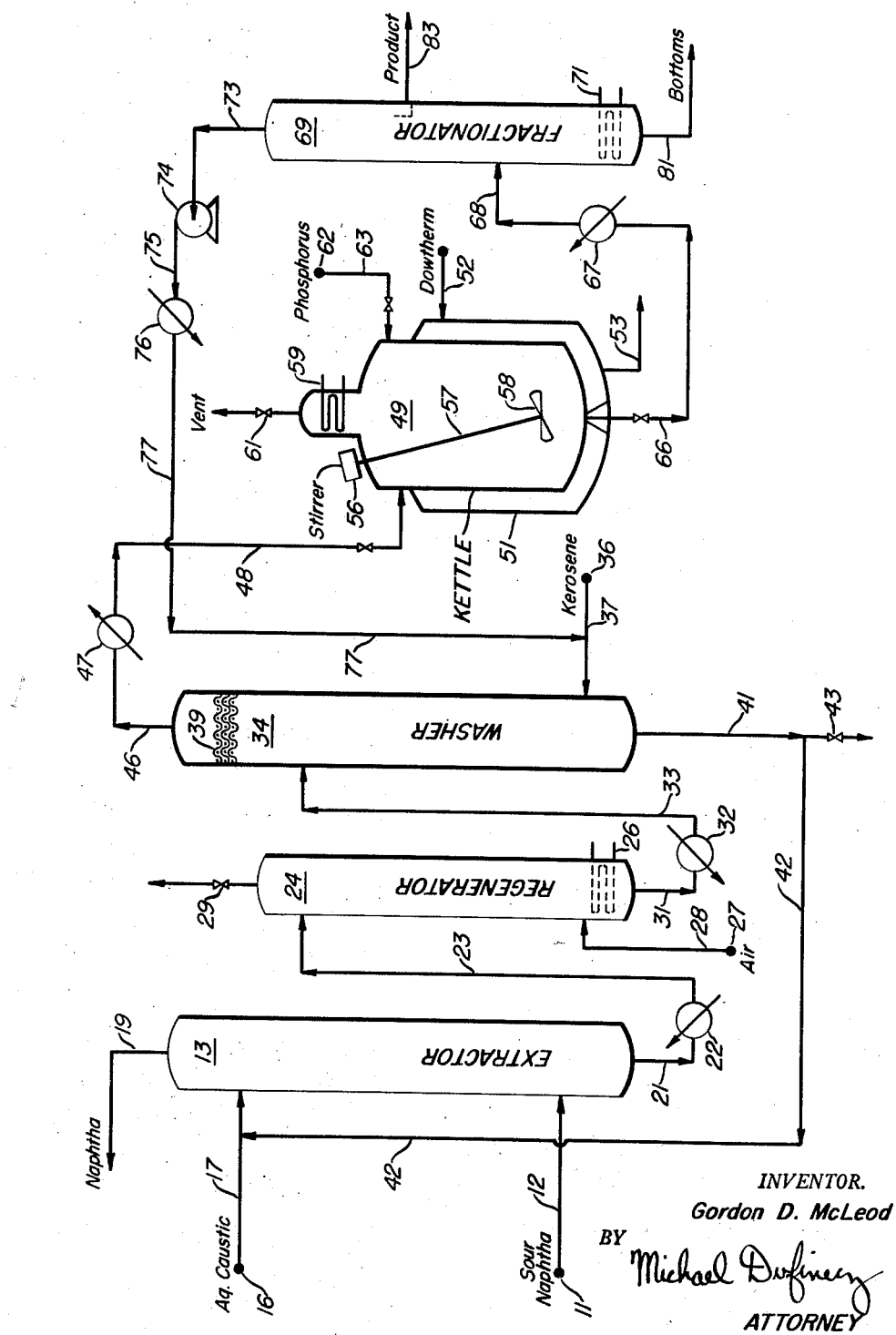

2,768,194
PREPARATION OF TRIALKYL TRITHIO-PHOSPHITES

Gordon D. McLeod, Lansing, Ill., assignor to Esso Research and Engineering Company, a corporation of Delaware Application May 29, 1953, Serial No. 358,367

13 Claims. (Cl. 260—461)

This invention relates to the production of organic trithiophosphites by the reaction of an organic disulfide with elemental phosphorus. More particularly the invention relates to the production of alkyl trithiophosphites by the reaction of an alkyl disulfide with elemental phosphorus in the presence of a solvent for the disulfide.

Organic trithiophosphites are known to be effective lube oil additives, particularly for heavy duty lubrication. Recently certain of the trialkyl trithiophosphites have been found to be particularly useful for a military purpose.

The simplest method for the preparation of an organic trithiophosphite consists in the reaction of the corresponding organic disulfide with elemental phosphorus. This reaction is taught by Stevens and Spindt, U. S. 2,542,370, issued February 20, 1951.

Ostensibly, the petroleum refining industry has available a vast supply of hydrocarbon disulfides such as alkyl disulfides, aryl disulfides, alkaryl disulfides, aralkyl disulfides and cycloalkyl disulfides. These disulfides are produced by the conversion of the corresponding mercaptans, which mercaptans have been removed from petroleum fractions such as naphthas, kerosenes and diesel oils. Generally the mercaptans are removed from the petroleum fraction by contacting said fraction with aqueous alkali hydroxide solution; the solution is regenerated by oxidizing the alkali metal-mercaptide contained therein to the corresponding disulfides, which disulfides are relatively insoluble in the alkali hydroxide solution. The insoluble disulfides are decanted from the alkali hydroxide solution. However, appreciable quantities of disulfides remain in the alkali hydroxide solution. Normally these disulfides are removed therefrom by washing the solution with a petroleum fraction such as naphtha or kerosene.

Ostensibly the most economical procedure for the preparation of the corresponding trithiophosphites would be to react the dissolved disulfides with elemental phosphorus in the presence of the solvent naphtha or solvent kerosene. The product trithiophosphite can be very readily separated from the solvent naphtha or solvent kerosene by vacuum distillation. This procedure theoretically would avoid any decomposition of disulfide to form mercaptan during the distillative separation of the solvent naphtha or solvent kerosene from the dissolved disulfide. However, it has been found that it is completely impractical to produce trithiophosphites by the method described in this paragraph when operating according to the teachings of U. S. 2,542,370

An object of this invention is the production of organic trithiophosphites by the reaction of an organic disulfide with elemental phosphorus. A particular object of the invention is the production of organic trithiophosphites by the reaction of an organic disulfide with elemental phosphorus in the presence of a hydrocarbon solvent for said disulfide. Another object is the preparation of alkyl trithiophosphites by the reaction of an alkyl disulfide with elemental phosphorus in the presence of a solvent for said disulfide, under conditions to render the solvent inert to said disulfide and said phosphorus. Another particular object is a process for washing hydrocarbon disulfides from an aqueous alkaline solution containing hydrocarbon disulfides and reacting said disulfides with elemental phosphorus in the presence of said wash liquid to form corresponding hydrocarbon trithiophosphites in high yields. Other objects of the invention will become apparent in the course of the detailed description thereof.

The process of this invention produces an organic trithiophosphite by reacting elemental phosphorus with an organic disulfide, in the substantial absence of other organic compounds reactive with phosphorus, at a temperature above the temperature of simple solution of phosphorus in said disulfide and below the decomposition temperature of the product trithiophosphites, which reaction is carried out in the presence of a hydrocarbon solvent selected from the class consisting of aliphatic, alaromatic, cyclylaromatic, alicycloparaffinic, cyclo-olefinic and alicyclo-olefinic and at a superatmospheric pressure great enough to cause the predominant reaction product to be the desired organic trithiophosphite.

A wide variety of disulfide compounds may be reacted with phosphorus to produce trithiophosphite compounds. For the purposes of this invention it is preferred to utilize hydrocarbon disulfides having the general formula R—S—S—R wherein R represents hydrocarbon groups selected from the class consisting of alkyl, alkenyl, cyclyl, aryl, alkaryl, aralkyl and cycloalkyl. It is to be understood that the hydrocarbon group may be the same or different groups selected from the above class, i. e., the hydrocarbon disulfide may be symmetrical or unsymmetrical. Examples of suitable disulfides are didodecyl disulfide, methyl hexyl disulfide, di-phenyl disulfide, di-naphthyl disulfide, di-cyclohexyl disulfide and amyl phenyl disulfide.

Particularly useful for the purposes of the invention are the lower molecular weight dialkyl disulfides, i. e., wherein the alkyl group contains from 1 to 4 carbon atoms. Examples of this preferred class are dimethyl disulfide, methyl ethyl disulfide, diethyl disulfide, di-n-propyl disulfide and ethyl isopropyl disulfide.

In addition to the above disulfides it has been found that a most useful mixture of trithiophosphites is obtained by reacting a natural mixture of disulfides. This natural mixture is obtained by extraction of a sour petroleum naphtha with aqueous caustic solution to obtain an aqueous caustic solution containing a mixture of mercaptides; converting these mercaptides to a corresponding mixture of disulfide; and reacting these disulfides with elemental phosphorus according to the procedure of this invention. It is preferred to operate with a mixture of disulfides which is composed substantially of alkyl disulfides such as is obtained by the extraction of a thermally cracked naphtha with aqueous caustic.

It has been found that the reaction of disulfides and elemental phosphorus does not proceed to any practical extent at atmospheric pressure in the presence of hydrocarbon solvents which contain a donatable hydrogen atom. When such hydrocarbon solvents are present in the reaction zone the predominant reaction appears to be the decomposition of the disulfides to the corresponding mercaptans. Previously it had been discovered that the reaction could be carried out to give high yields of the desired trithiophosphite in the presence of a hydrocarbon solvent selected from the class consisting of cycloparaffins and methyl cycloparaffins; for example, cyclohexane, decalin, methyl decalin, pinane, etc. (This discovery is the subject of application Serial Number 345,102, filed March 27, 1953, by Gordon D. McLeod and Edmond L. d'Ouville.)

It has been discovered that hydrocarbon solvents for organic disulfides can be present in the reaction zone without any adverse effect on the yield and product quality of the desired organic trithiophosphite when the reaction zone is maintained at a superatmospheric pressure. The minimum superatmospheric pressure necessary to be maintained in the reaction zone is dependent upon the type of hydrocarbon solvent present therein. Thus paraffinic solvents require the least amount of superatmospheric pressure and the terpenes require the greatest amount of superatmospheric pressure in order to produce trithiophosphite as the predominant reaction product. The amount of superatmospheric pressure maintained in the reaction zone may be from as little as about 1 p. s. i. a above atmospheric pressure in the case of paraffinic solvents to as much as about 115 p. s. i. a. above atmospheric pressure in the case of terpenes such as α-pinene.

The optimum pressure for any particular hydrocarbon solvent may be readily determined by carrying out a very small number of experiments in the presence of the particular solvent.

Since the undesired side reaction appears to be the formation of mercaptans by the reaction of the hydrocarbon solvent and the organic disulfide, for successful reaction of the organic disulfide and the elemental phosphorus at atmospheric pressure, it is necessary to utilize a hydrocarbon solvent that does not contain a donatable hydrogen atom. Examples of satisfactory solvents for operation at atmospheric pressure are decalin, naphthalene and tertiary butylbenzene. Hydrocarbon solvents selected from the class consisting of aliphatic, alkyl aromatic hydronaphthalenes and indanes, lower alkylcycloparaffinic, cyclo-olefinic and lower alkylcyclo-olefinic are effective as hydrocarbon solvents when the reaction is carried out at pressures above atmospheric, i. e., above about 15 pounds per square inch absolute. Examples of these hydrocarbon solvent that are effective at superatmospheric pressure are: (1) aliphatic: octane, decane, hexadecane and heptene. (2) lower alkyl aromatic: ethylbenzene, n-butylbenzene, ethyltoluene, and butyl naphthalene. (3) dihydronaphthalene, tetrahydronaphthalene and indane. (4) lower alklycyclo-paraffinic: ethylcyclohexane, propylcyclohexane, and ethyldecalin. (5) cyclo-olefinic: cyclohexene. (6) lower alkylcyclo-olefinic; methylcyclohexene, ethylcyclohexene, and terpenes such as α-pinene.

As the reaction occurs in the liquid state of both the disulfide and the elemental phosphorus, it is necessary that the hydrocarbon solvent be a liquid at the reaction temperature.

The reaction temperature must be high enough to cause solution of the elemental phosphorus in the disulfide-solvent liquid phase. This temperature will vary with the type of disulfide and/or hydrocarbon solvent present in the reaction zone. The rate of reaction, i. e., the contacting time, is favorably influenced by operation at temperatures above the solution temperature. However, it is necessary to operate below the decomposition temperature of the product trithiophosphites. This upper temperature varies with the type of trithiophosphite being produced. In the case of triethyl trithiophosphite appreciable decomposition occurs at temperatures on the order of 300° C. In general while the temperature range of between about 150° and 250° C. has been found suitable for the purposes of this invention, it is preferred to operate between about 170° and 210° C.

The time needed to substantially complete the reaction between the elemental phosphorus and the disulfide is dependent upon the temperature in the reaction zone and the degree of agitation maintained therein. Since the phosphorus is quite soluble in the disulfide-solvent liquid at the preferred reaction temperatures, the degree of agitation is of importance primarily only in shortening the time of solution of the liquefied phosphorus in the disulfide-solvent liquid. The contacting time needed to attain substantial completion of the reaction is quite long at low temperatures. Thus at about 150° C. a contacting time of 50 hours or more may be required. As the reaction temperature is increased the reaction time decreases quite rapidly. Thus at a temperature of about 200° C. a time of about 2 hours may be sufficient. In general when operating at a temperature between about 170° and 210° C. the reaction time should be between at least about 1 hour and 50 hours, the shorter times corresponding to the higher temperatures. At temperatures below the point of incipient decomposition of the product trithiophosphites prolonged contacting times are not harmful.

The amount of hydrocarbon solvent present in the reaction zone has some effect on the contacting time required to substantially complete the reaction. However, for the preferred amounts of solvent present, the relationship of time and temperature given above is adequate. Beneficial results on the quality of reaction product are obtained when using as little as 10 volume percent of hydrocarbon solvent, based on disulfide. More than this amount is desirable and as much as or even more than 500 volume percent may be used. It is preferred to operate with between about 120 and 250 volume percent of hydrocarbon solvent, based on disulfide. It is to be understood that the amount of solvent present will be in part determined by the amount of disulfide dissolved in the aqueous caustic solution which is the preferred source of the alkyl disulfides used for the preparation of the mixed alkyl trithiophosphite product.

The annexed drawing shows an illustrative schematic embodiment of a preferred operation using the process of this invention. It is to be understood that many items of process equipment such as pumps and valves have been omitted from this illustrative embodiment; these items may readily be added thereto by one skilled in the art.

In the drawing a sour naphtha, i. e., mercaptan containing, boiling between 100° and 385° F. derived from the thermal cracking of a virgin gas oil, from source 11 is passed through line 12 into lower part of extractor 13. Extractor 13 is a vertical cylindrical vessel provided with packing which permits intimate contacting of two immiscible liquids. The packing may be Raschig rings, Berl saddles, alumna spheres, etc., or may be a bubble tray-type arrangement. Extractor 13 may be provided with means for controlling the temperature of the contents if operation at other than atmospheric temperature is desired.

Aqueous NaOH solution from source 16 is passed through line 17 into an upper portion of extractor 13. In this case the aqueous caustic solution contains about 25 weight percent of NaOH. However, the concentration may vary from about 15 weight percent to the saturation content. Instead of NaOH, KOH may be used. Solutizers which increase the solubility of mercaptans in the caustic may be present. It is preferred that the solutizer, if any is used in extractor 13, be of such a type that it is not readily removed from the caustic solution by the hydrocarbon solvent. Petroleum cresols in the form of sodium cresyllates are suitable for this use. The amount of aqueous caustic solution relative to sour naphtha may vary depending on the type of naphtha and the conditions of contacting. Herein about 2 volumes of sour naphtha is present per volume of aqueous caustic solution. The refined naphtha which is substantially sweet, i. e., free of mercaptans, is removed from extractor 13 and is passed to storage not shown by way of line 19.

The aqueous caustic-sodium mercaptide solution is withdrawn from extractor 13 and is passed by way of line 21, heat exchanger 22 and line 23 into regenerator vessel 24. Regenerator 24 is provided with an internal heat exchanger 26. In regenerator 24 the mercaptan containing aqueous caustic solution is treated with air from source 27 and line 28. In order to speed up the oxidation of the mercaptans to disulfides, regenerator 24 is operated at an elevated temperature; herein about 175° F. Gases from the regeneration are vented from regenerator 24 by way of valved line 29.

Regenerated aqueous caustic solution which now contains alkyl disulfides are withdrawn from regenerator 24 and passed by way of line 31, heat exchanger 32 and line 33 into an upper portion of washer 34. In order to improve the washing operation the temperature of the disulfide-aqueous mixture is lowered in heat exchanger 32 to about that of cooling water. Washer 34 is a vertical cylindrical vessel provided with packing similar to that of extractor 13.

In addition to the more or less pure hydrocarbon solvents previously enumerated, the naturally occurring mixtures of hydrocarbons obtained from petroleum may be used in this process. Examples of suitable mixtures are: virgin distillates, such as heavy naphtha, kerosene, heater oil and gas oils; cracked distillates such as cracked naphtha and cycle oils. Even as when using high purity solvents it is desirable that the petroleum distillates should be readily separable from the product trithiophosphite by fractional distillation. When the trithiophosphites are to be used as additives for petroleum oils it may be desirable to use as the hydrocarbon solvent some of the oil into which the trithiophosphite will be blended. In this case it is not necessary to separate the trithiophosphite from the hydrocarbon solvent as the solution of the two materials can be blended directly with the final product oil. For some uses a blend of trithiophosphite and hydrocarbon solvent may be the desired product and in such a case the product mixture may be withdrawn from the reaction zone and passed to product storage tanks without making a separation of the solvent and the trithiophosphite.

Kerosene boiling between about 350° and 450° F. from source 36 is passed by way of line 37 into a lower portion of washer 34. The amount of kerosene charged to washer 34 is such that the final disulfide-kerosene solution will contain about 30 volume percent of disulfide. The disulfide-rich solvent solution is passed through a wire mesh coalescer 39 set near the upper end of washer 34. This coalescer removes substantially all the aqueous caustic solution occluded by the disulfide-rich kerosene solution.

Disulfide denuded aqueous caustic solution is withdrawn from washer 34 by way of line 41 and is recycled to line 17 by way of valved line 42. Some of the aqueous caustic solution may be discarded by way of line 41 and valved line 43.

Disulfide-rich kerosene solution is withdrawn from washer 34 and is passed by way of line 46, heat exchanger 47 and valved line 48. It is to be understood that under some conditions of operation it may be necessary to use disulfide containing kerosene as the wash oil in order to attain the desired kerosene-to-disulfide ratio. The disulfide-kerosene solution is passed from valved line 48 into reactor 49.

In this embodiment reactor 49 consists of a glass-lined kettle provided with a shell 51 heated by means of a Dowtherm medium circulated by way of lines 52 and 53 through shell 51. The kettle is maintained at a reaction temperature of about 190° C. Kettle 49 is provided with a stirrer means consisting of a driving motor 56, a shaft 57 and a propeller 58. Kettle 49 is also provided with a reflux condenser 59 and a vent 61, which is closed in this embodiment.

Liquefied yellow phosphorus from source 62 is passed by way of valved line 63 into kettle 49. The phosphorus-disulfide-kerosene contents are kept thoroughly agitated until the phosphorus is completely dissolved as the contents of the kettle approach the desired operating temperature of 190° C. The pressure in kettle 49 may be permitted to rise to that naturally resulting from the vapor pressure of the kerosene at the reaction temperature or a somewhat lower pressure can be maintained by partially condensing the vapors by means of a reflux condenser. In this embodiment the reaction kettle 49 is maintained at a pressure of about 25 p. s. i. a.

Although yellow phosphorus is used herein, other forms of phosphorus may be employed. Red phosphorus is converted to yellow phosphorus at elevated temperatures and may be employed effectively when the reaction is carried out at such elevated temperatures.

The total reaction time in this illustration at this temperature is 4 hours. At the end of this time essentially all the phosphorus has reacted with the disulfide. In order to essentially eliminate the presence of unreacted phosphorus in the product trithiophosphites, a slight excess of disulfide over the theoretical ratio of 1.5 mols per mol of phosphorus is present in kettle 49.

The mixture of reaction products is withdrawn from kettle 49 by way of valved line 66, heat exchanger 67 and line 68. The mixture is charged by way of line 68 into fractionator 69 which is provided with internal heat exchanger 71. Fractionator 69 illustrates schematically the separation of unreacted disulfide and kerosene as a single fraction, a product fraction and a heavier fraction of side reaction products. Fractionator 69 is operated under a vacuum of about 1 mm. of Hg to avoid decomposition of the product trithiophosphite.

A kerosene-disulfide fraction is taken overhead from fractionator 69 by way of line 73, vacuum pump 74, line 75, cooler 76 and line 77. From line 77 this fraction is recycled by way of line 37 to washer 34. A heavy side-reaction bottoms fraction is passed to storage not shown by way of line 81.

The product trithiophosphites, which in this case consist essentially of trialkyl trithiophosphites containing from 1 to 4 carbon atoms in each alkyl group, are passed by way of line 83 to storage not shown.

It is to be understood that the recovery of mercaptans from sour naphthas is very old in the petroleum art and that the above description is not limiting. It is intended to include within the scope of the invention all the methods known for recovery of mercaptans from sour petroleum fractions and for subsequent conversion to disulfides.

The results obtainable with the process of this invention and comparative examples under other conditions are presented below. The test carried out at atmospheric pressure and also tests 13 and 14 were carried out in a 3-necked glass flask provided with a propeller stirrer. The atmospheric pressure, i. e., about 14.7 p. s. i. a. tests were carried out as follows: (1) flushing the flask with cylinder nitrogen, (2) adding disulfide and solvent to the flask, (3) adding solid yellow phosphorus to the flask, (4) bubbling a slow stream of nitrogen through the liquid in the flask and venting said nitrogen to a hood. The flask was heated to reaction temperature and maintained agitated for a time long enough to convert the phosphorus. In all the experiments an excess of disulfide over the theoretical amount needed to react with the phosphorus was present. At the end of the reaction time the flask was cooled and the mixture of reaction products distilled.

The superatmospheric pressure tests were carried out in a stainless steel pressure vessel provided with a magnetically actuated stirrer. Pressures were obtained by means of a Bourdon gauge. In the superatmospheric pressure tests wherever necessary an atmosphere of nitrogen was present in the reactor in order to provide the desired pressure; that is, in tests wherein the desired reaction temperature was above the boiling point of the solvent and/or disulfides.

The disulfides used were either (A) C. P. disulfide or (B) a natural mixture of disulfides obtained by the conversion of mercaptans extracted from a thermal cracked heavy naphtha. The composition of the natural mixture of mercaptans used to produce the mixed disulfides was: methyl, 25 mol percent; ethyl, 45%; propyl, 25%; and butyl, 5%.

The solvents were commercial grade purity single compounds except for one petroleum mixture. This kerosene was derived from the distillation of a Mid-Continent crude oil and was of excellent burning quality and high diesel index. The boiling range of the kerosene is given below:

ASTM distillation, ° F.: Kerosene
  Initial _____ 340
  10% _____ 380
  50% _____ 425
  90% _____ 470
  Max _____ 510
° API _____ 42.5
Sulfur, wt. percent _____ 0.09

The results of this series of tests are listed in Tables I and II.

described above except that no nitrogen was bubbled through the liquid during the test. The flask was vented to the atmosphere. The results of this test indicate that the yield of the desired trithiophosphite was less than that obtained when nitrogen was bubbled through at atmospheric pressure (note Test 3).

Test 13 was carried out without the use of a nitrogen stream and also without venting the flask to the atmosphere, i. e., the reaction was carried out at the pressure naturally built up therein during the course of the reaction. The reaction proceeded very smoothly and gave results only slightly poorer than those of Test 4 wherein a pressure at 25 p. s. i. a. was used.

Test 14 was carried out in an attempt to determine the minimum amount of superatmospheric pressure to be maintained on the reaction zone. In this test the reaction was carried out in the glass flask with the vent of the flask connected to one leg of the U-tube. The other leg of the U-tube was opened to the atmosphere. A few millimeters of mercury were placed into the U-tube to

*Table I*

| Test No. | 1 | 2 | 3 | 4 | 5 | 6 | 7 | 8 |
|---|---|---|---|---|---|---|---|---|
| Reaction Charge: | | | | | | | | |
|   Phosphorus, g | 10 | 6 | 10 | 6 | 13 | 6 | 6.5 | 10. |
|   Disulfide, Type | Mixed | Ethyl | Mixed | Ethyl | Ethyl | Ethyl | Ethyl | Mixed. |
|   Disulfide, ml | 105 | 60 | 105 | 60 | 105 | 60 | 50 | 105. |
|   Solvent, Type | Kerosene | Kerosene | Decane | Decane | Tetralin | Tetralin | Heptene-1 | n-Butylbenzene. |
|   Solvent, ml | 105 | 50 | 150 | 50 | 100 | 50 | 50 | 150. |
|   Temperature, ° C | 185 | 200 | 165 | 205 | 163 | 200 | 210 | 167. |
|   Time, Hours | 75 | 5 | 90 | 2 | 34 | 2.5 | 4 | 144. |
|   Pressure, p. s. i. a | atm | 20 | atm | 25 | atm | 20 | 70 | atm. |
| Reaction Product: | | | | | | | | |
|   Color of Mixture | Black | Straw | Black | Straw | Black | Straw | Straw | Black. |
|   Phosphorus, unreacted | Yes | No | Yes | No | Yes | No | Yes | Yes. |
|   Trithiophosphite Yield (70°–110° C. at 1 mm.) | <5 | 95 | <5 | 98 | <10 | 98 | 70 | <5. |

*Table II*

| Test No. | 9 | 10 | 11 | 12 | 13 | 14 | 15 |
|---|---|---|---|---|---|---|---|
| Reaction Charge: | | | | | | | |
|   Phosphorus, g | 10 | 6.5 | 6.5 | 6.5 | 6.5 | 7 | 5. |
|   Disulfide, Type | Mixed | Ethyl | Ethyl | Ethyl | Ethyl | n-Butyl | n-Butyl. |
|   Disulfide, ml | 105 | 60 | 60 | 60 | 60 | 50 | 50. |
|   Solvent, Type | α-Pinene | α-Pinene | α-Pinene | Decane | Decane | Hexadecane | Hexadecane. |
|   Solvent, ml | 125 | 60 | 60 | 60 | 60 | 100 | 50. |
|   Temperature, ° C | 190 | 190 | 210 | 168 | 160 | 190 | 190. |
|   Time, Hours | 82 | 7 | 12 | 12 | 18 | 6 | 8. |
|   Pressure, p. s. i. a | atm | 65 | 115 | atm | ca. 15 | 15 | (*). |
| Reaction Product: | | | | | | | |
|   Color of Mixture | Black | Straw | Straw | Black | Straw | Straw | Straw. |
|   Phosphorus, unreacted | Yes | Yes | No | Yes | No | No | No. |
|   Trithiophosphite Yield (70°–110° C. at 1 mm.) | <10 | 50 | 90 | Trace | 90 | 90 | 90. |

\* Note comment in text.

In the tests the presence of small amounts of unreacted phosphorus was determined by exposing to the atmosphere a glass rod which had been dipped into the reaction product mixture. Fuming of the liquid indicates the presence of unreacted phosphorus. Large amounts of unreacted phosphorus appear in the form of a solid in the reactor.

The trithiophosphite yield was taken as the amount of material boiling between 70° and 110° C. at 1 mm. Hg pressure. In all cases the hydrocarbon solvent boiled outside this range of temperatures.

The tests show that with the exception of α-pinene it is possible to shift the yield of trithiophosphite from between about 5 and 10% to amounts in excess of about 90%. Tests 9 to 11 show that even with α-pinene it is possible to get a very high yield of trithiophosphite by increasing the pressure maintained on the reaction mixture. For some reason pinene requires the maintenance of pressures far greater than those required for the other hydrocarbon solvents of this invention. It is also noteworthy that without exception the tests carried out at superatmospheric pressure resulted in product mixture of a desirably good color.

Test 12 was carried out at atmospheric pressure as seal the flask from the atmosphere. As the reaction proceeded a slight amount of nitrogen was bubbled through the liquid under conditions such that the U-tube provided a positive pressure on the reaction zone of a few mm. of mercury. As the data show, an excellent yield of trithiophosphite was obtained.

Test 15 was carried out in the pressure reactor under conditions to more closely observe the materials present in the vapor space of the reactor. In this test the butyldisulfide, the phosphorus and the hexadecane were introduced into the reactor at room temperature. The vapor space was evacuated by means of a vacuum pump and the outlet to the pump was then closed. The reactor was heated to a temperature of 190° C. After about one hour the pressure within the reactor had built up to a reading that is above atmospheric pressure. The heating was stopped and the reactor cooled to room temperature. A slight positive superatmospheric pressure was still present. The vapor space was evacuated by means of the vacuum pump and the gases cooled in a Dry Ice-cooled receiver. The reactor was then again heated to 190° C.; again a superatmospheric pressure had built up therein. Again the reactor was cooled and the vapor space evacuated to a Dry Ice-cooled receiver. This evacuation, heating, development of pressure, cooling and evacuation cycle was repeated four more times. At the end of six cycles the yield of trithiophosphite was determined. Comparison of Tests 14 and 15 show no difference in the yield of the desired product. Analysis of the condensate from the Dry Ice receiver showed the gaseous effluent from the reactor to be butyl mercaptan. The trithiophosphite yield does not reflect the loss of disulfide to butyl mercaptan because an excess of disulfied over the theoretical was present in the reaction zone.

Tests 13 and 15 show that while a superatmospheric pressure must be maintained on the reaction zone, this pressure may be obtained either by external means such as inert gaseous pressure or by the natural buildup of pressure either as disulfide and/or solvent vapor or by the pressure of the undesired side reaction product. In order to avoid the loss of disulfide to undesired mercaptan, it is preferred to pressure the reaction zone with an inert gas.

Thus having described the invention, what is claimed is:

1. A process for producing trialkyl trithiophosphite, which process comprises reacting phosphorous with a lower alkyl disulfide in the substantial absence of other organic compounds reactive with phosphorous, in the presence of a hydrocarbon solvent selected from the class consisting of paraffinic, olefinic, alkylbenzenes, alkylnaphthalenes, dihydronaphthalenes, tetrahydronaphthalenes, indanes, lower alkylcycloparaffinic, cycloolefinic, and lower alkyl cycloolefinic, said paraffins, olefins and alkyl groups having at least 1 $CH_2$—$CH_2$ linkage, at a temperature within the range of about 150° to 250° C. for a time between at least one hour and 50 hours, the shorter times corresponding to the higher temperatures and at superatmospheric pressure in the range of 1 p. s. i. a. to 115 p. s. i. a. in excess of atmospheric and recovering product trialkyl trithiophosphite from the reaction product mixture.

2. The process of claim 1 wherein said solvent is a kerosene.

3. The process of claim 1 wherein said solvent is tetralin.

4. The process of claim 1 wherein said solvent is pinene.

5. The process of claim 1 wherein said solvent is butylbenzene.

6. The process of claim 1 wherein said solvent is decene.

7. The process of claim 1 wherein said disulfide is dimethyl disulfide.

8. The process of claim 1 wherein said disulfide is diethyl disulfide.

9. A process of producing a trialkyl trithiophosphite, which process comprises reacting elemental phosphorus in an amount less than the theoretical, with a dialkyl disulfide wherein each alkyl group contains from 1 to 4 carbon atoms, in the substantial absence of other organic compounds reactive with phosphorus, in the presence of a terpene, at a temperature between about 150° and about 250° C. at a pressure between about 50 p. s. i. a. and 115 p. s. i. a. in excess of atmospheric for a time between about at least one hour and 50 hours, the shorter times corresponding to the higher temperatures, which time is sufficient to substantially complete the reaction of phosphorus and disulfide and recovering trialkyl trithiophosphite from the reaction product mixture.

10. The process of claim 9 wherein the terpene is present in an amount between about 120 and 250 volume percent based on disulfide.

11. A process of producing trialkyl trithiophosphites, which process comprises (1) contacting a sour naphtha containing lower alkyl mercaptans with a concentrated aqueous alkali hydroxide solution to obtain an aqueous-alkali hydroxide-alkali mercaptide solution, (2) treating said mercaptide solution to convert mercaptans to disulfides, (3) washing said mixture of disulfides and aqueous alkali hydroxide solution with a disulfide solvent selected from the hydrocarbon class consisting of paraffinic, olefinic, alkylbenzenes, alkylnaphthalenes, dihydronaphthalenes, tetrahydronaphthalenes, indanes, lower alkylcycloparaffinic, cycloolefinic, and lower alkylcycloolefinic, said paraffins, olefins and alkyl groups having at least 1 $CH_2$—$CH_2$ linkage, to remove substantially all of the disulfides therefrom, (4) removing occluded aqueous alkali hydroxide solution from disulfide-solvent solution, (5) contacting said disulfide-solvent solution with an amount of elemental phosphorous less than the theoretical at a temperature between about 150° C. and 250° C. for a time between about at least one hour and 50 hours, the shorter times corresponding to the higher temperatures at a pressure in the range of 1 p. s. i. a. to 115 p. s. i. a. in excess of atmospheric, (6) distilling said reaction product mixture to recover unreacted disulfides, solvent and trialkyl trithiophosphite and (7) recycling said solvent to the washing zone of step 3.

12. The process of claim 11 wherein said solvent is a pinene.

13. The process of claim 11 wherein said solvent is a kerosene.

References Cited in the file of this patent

UNITED STATES PATENTS 2,542,370     Stevens  ---------------- Feb. 20, 1951